US006776432B2

(12) United States Patent
Harkcom et al.

(10) Patent No.: US 6,776,432 B2
(45) Date of Patent: Aug. 17, 2004

(54) DRAWBAR ADAPTER FOR PULL-THROUGH SWIVEL HITCH

(75) Inventors: Melanie W. Harkcom, New Holland, PA (US); Terry A. Young, Lititz, PA (US); Thomas L. Stiefvater, Ephrata, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/945,886

(22) Filed: Sep. 4, 2001

(65) Prior Publication Data

US 2002/0047246 A1 Apr. 25, 2002

Related U.S. Application Data

(60) Provisional application No. 60/230,027, filed on Sep. 5, 2000.

(51) Int. Cl.[7] .................................................. B60D 1/01
(52) U.S. Cl. ...................... 280/494; 56/14.9; 172/74; 172/248; 180/53.1
(58) Field of Search .................. 180/53.1, 53.3, 180/14.4; 280/461.1, 482, 504, 514, 515, 492–494; 56/157, 15.2, 15.5, 14.9; 172/47, 74, 248, 679

(56) References Cited

U.S. PATENT DOCUMENTS

| | | | | |
|---|---|---|---|---|
| 4,714,123 A | * | 12/1987 | Ermacora et al. | 180/14.4 |
| 5,158,500 A | * | 10/1992 | McLean | 180/53.1 |
| 5,186,483 A | * | 2/1993 | Sheppard | 280/494 |
| 5,339,907 A | * | 8/1994 | Roth | 172/678 |
| 5,531,283 A | * | 7/1996 | Austin et al. | 180/53.1 |
| 5,647,604 A | * | 7/1997 | Russell | 280/492 |
| RE35,835 E | * | 7/1998 | Eidam et al. | 180/14.4 |
| 6,203,049 B1 | * | 3/2001 | Gibson | 280/494 |
| 6,328,327 B1 | * | 12/2001 | Ligouy | 280/492 |

OTHER PUBLICATIONS

Sales Literature for New Holland DISCBINE Disc Mower–Conditioners, published Sep. 14, 1999, printed in U.S.A.

* cited by examiner

Primary Examiner—Anne Marie Boehler
(74) Attorney, Agent, or Firm—John William Stader; Collin A. Webb

(57) ABSTRACT

One embodiment of the invention relates to an adapter assembly for a towing vehicle having a drawbar hitch for connecting a towed implement having a pull-through swivel hitch assembly to the towing vehicle. The adapter assembly includes a drawbar extension member having a horizontal cross pin, a clamp assembly to secure the drawbar extension member to the drawbar, an adapter frame having a hook to engage the cross pin, and a trunnion pin to couple the adapter frame to the swivel hitch assembly.

11 Claims, 4 Drawing Sheets

DRAWBAR ADAPTER FOR PULL-THROUGH SWIVEL HITCH

This application claim the benefit of Provisional Application No. 60/230,027, filed Sep. 5, 2000.

FIELD OF THE INVENTION

The present invention relates generally to a towed implement that is towed and mechanically powered by a towing vehicle. In particular, this invention relates to an adapter assembly carried by the drawbar of a towing vehicle for connection to a towed implement having a pull-through swivel gearbox assembly.

BACKGROUND OF THE INVENTION

Pull type implements have been used in farming operations for decades. For example, the agricultural implement may be a mower designed to cut and process hay or other crops. The implement may also be configured as a forage harvester, hay recovery implement, baler, sprayer, or ground breaking implement. Typically, the implement is towed and powered by a towing vehicle such as a tractor. A power-take-off shaft (PTO) of the tractor typically provides mechanical power to the implement.

The implement is typically connected to the tractor by a pivoting draft tongue. In many implements, a hydraulic swing cylinder interconnects the implement frame and the draft tongue. The hydraulic cylinder controls the pivotal movement of the draft tongue. The pivoting tongue may be positioned so that the implement is directly behind the tractor or to the left or right side of the tractor. As previously indicated, the implement is mechanically powered by the PTO on the tractor. Hydraulic pressure for the implement is provided by the hydraulic system of the towing vehicle.

There are two common methods of attaching the draft tongue of the implement to the towing vehicle. One is to connect the draft tongue directly to the drawbar of the towing vehicle. A simple hitch pin can be used to drop through a hole in the draft tongue and into a hole in the towing vehicle drawbar. The implement tongue may also have a ball joint to allow freedom of rotation about the vertical (yaw) axis, the horizontal (pitch) axis and the fore and aft (roll) axis or the hitch pin joint may be loose enough to allow the rotation needed.

The other method of attaching the draft tongue of an implement to a towing vehicle is to use a swivel hitch on the implement. A swivel hitch involves a set of gearboxes, one above the other, with a connecting drive shaft between them. The gearboxes can swivel relative to each other. The relative swivelling motion becomes the vertical (yaw) axis of rotation.

Typically, the swivel hitch has a frame member that pivots on the same yaw axis as the swivel gearboxes and connects to the three point hitch assembly on the towing vehicle. The upper gearbox Is fixed to the draft tongue. The lower gearbox and swivel hitch frame pivot relative to the upper gearbox and follow the tractor as it turns.

The advantage of the swivel hitch over the standard pinned connection is that the yaw axis is further behind the towing vehicle, allowing for much sharper turns. With a pinned drawbar connection, the hitch point is close to the tractor. Thus the tractor can not turn sharply because the rear tire will engage the draft tongue of the implement.

There are two types of swivel hitch designs common in the industry. One is a pull-through design wherein the gearboxes are connected structurally to transmit load from the swivel hitch frame to the draft tongue. The other design involves a swivel hitch frame that is connected structurally to the draft tongue so that the implement does not transmit any structural load through the gearboxes.

The advantage of the pull-through design is that it is a much simpler design and does not require a device to guide the lower gearbox to follow the tractor, since the swivel hitch frame is connected directly to the lower gearbox.

Preferably a trunnion assembly is also located adjacent the gearbox assembly on the draft tongue of the implement. The trunnion assembly allows the implement to rotate or tilt about the fore and aft longitudinal roll axis.

One major drawback to any swivel hitch is that many tractors are not equipped with a three-point hitch system. Also, some operators find the lower links of a three-point hitch cumbersome to hook up.

For these reasons, a mechanism to adapt a tractor drawbar for connection to the swivel hitch of a pivoting draft tongue is desired.

SUMMARY OF THE INVENTION

One object of the present invention is to provide a drawbar hitch adapter assembly that allows a mechanically powered implement having a pull-through gearbox assembly to connect to the drawbar of a tractor.

Thus, one embodiment of the invention includes an adapter assembly for a towing vehicle having a drawbar hitch for connecting a towed implement having a pull-through swivel gearbox assembly to the towing vehicle. The adapter assembly includes a drawbar extension portion having a horizontal cross pin, a clamp assembly to secure the drawbar extension portion to the drawbar, an adapter frame portion having an open hook to engage the cross pin and a trunnion assembly to couple the adapter frame portion to the swivel hitch assembly.

The adapter assembly may further include a pivotally mounted pawl on the adapter frame to rotate from an open position to a closed position to secure the open hook in the closed position.

The adapter assembly may also include a flat vertical surface on the hook for contact by the cross pin when the tow vehicle is moved into a hitching position with the towed implement so as to indicate an alignment position of the cross pin relative to the hook.

BRIEF DESCRIPTION OF THE DRAWINGS

The features of the present invention will be apparent upon consideration of the following detailed disclosure of the invention, especially when taken in conjunction with the accompanying drawings wherein.

DETAILED DESCRIPTION OF THE PREFERRED EMBODIMENTS

Figure 1:
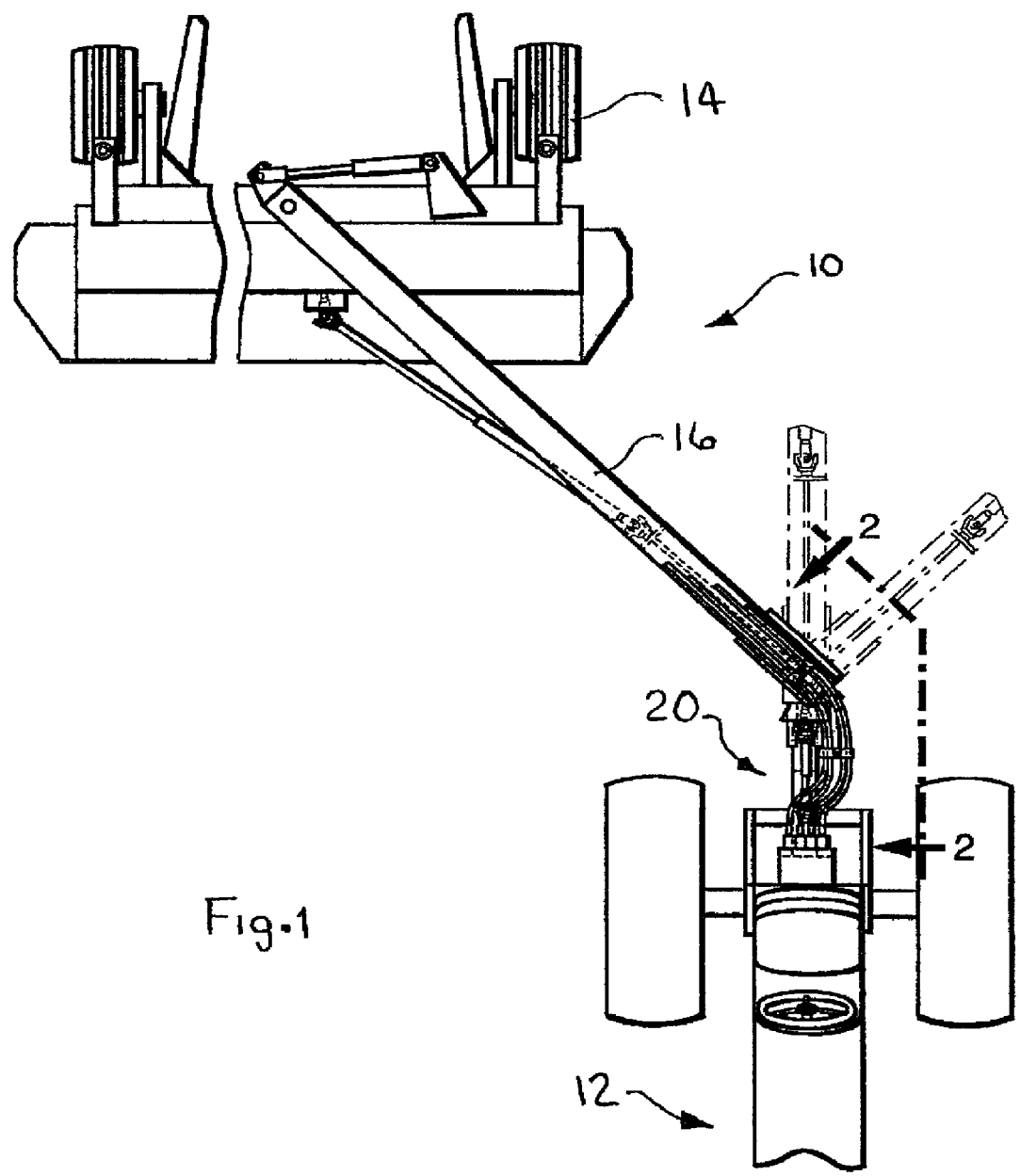
FIG. 1 is a top plan view representing a towing vehicle such as a tractor and a towed implement having a pivoting draft tongue incorporating the present invention.

Referring now to FIG. 1, a towed agricultural implement 10 is shown connected to a towing vehicle 12, such as a tractor. The implement 10 is thereby towed generally behind the towing vehicle 12 during operation and transport. FIG. 1 shows that the towing vehicle 12 can tow the implement 10 in an extended straight-line position and also in an angled position, as is the situation for example when a tight turn at the end of a field is being performed.

The towed implement 10 includes a pair of ground support wheels 14 and a pivoting forward extending draft tongue 16. The towed implement 10 includes a driven, articulated power shaft, which transmits mechanical drive from the towing vehicle 12 to the working parts of the implement 10.

In a pull through swivel hitch type of implement, the power transmitting mechanism includes a gearbox assembly 20. The gearbox assembly includes an upper gearbox 22 fixed to and rotating with the pivotal draft tongue. A lower gearbox 24 is connected to the upper gearbox by a driveshaft but can pivot relative to the upper gearbox and the draft tongue. A trunnion assembly 26 is provided adjacent the lower gearbox.

To provide mechanical drive for the implement 10, the towing vehicle 12 is equipped in its rear region with a known power take-off (PTO) stub shaft 28 which is connected to the articulated power shaft of the implement.

The forward end of the pivoting draft tongue 16 is coupled to the towing vehicle 12 by a coupling mechanism. Usually, the towing vehicle 12 is an agricultural tractor with a three point hitch assembly. A three point hitch assembly includes lower draft arms and an upper center arm, which can be moved vertically, in a well known manner, in order to raise or lower an attached tool or implement. The three-point hitch arrangement however is not employed with this invention and therefore details of its construction are not included in the drawings.

The connecting and towing mechanism of the present invention is a fixed drawbar hitch, shown generally at 30. The connecting assembly for towing the implement from the drawbar hitch 30 according to the present invention is the drawbar adapter assembly shown generally at 32.

Figure 2:
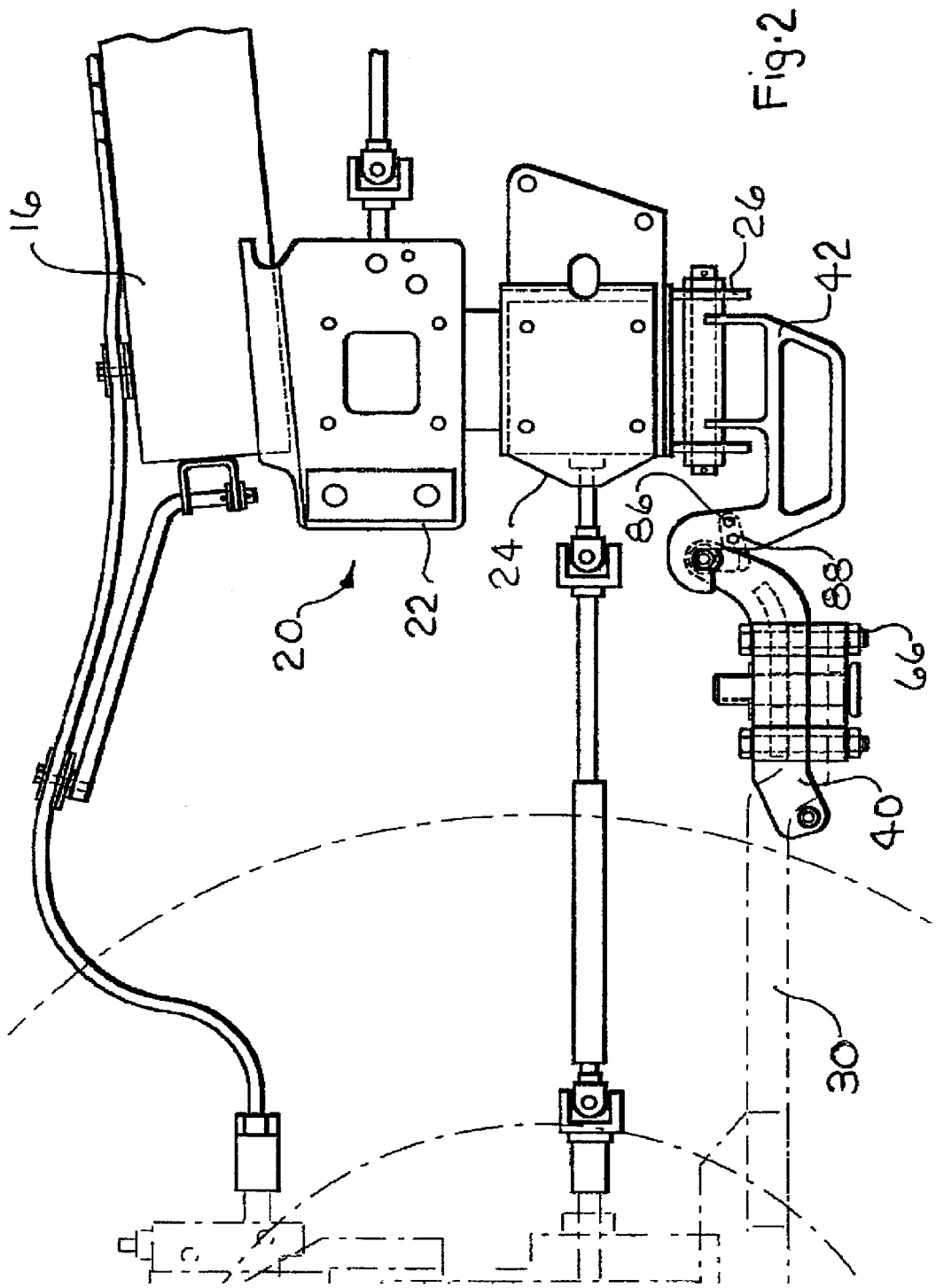
FIG. 2 is a side view of the adapter assembly of the present invention mounted to the drawbar hitch of a towing vehicle and the pull-through gearbox assembly on the pivoting draft tongue of the towed implement of FIG. 1.

As shown in FIG. 2, the drawbar adapter assembly 32 is generally a pin and hook system. The system includes two frame portions 40 and 42. A first frame portion 40 of the adapter assembly 32 is clamped to the drawbar hitch 30 of the tractor. The second frame portion 42 of the drawbar adapter assembly 32 is attached to the pivoting draft tongue 16 of the pull through implement at the trunnion assembly 26 adjacent lower gearbox 24. The trunnion assembly 26 provides for roll axis freedom for the towed implement.

Figure 3:
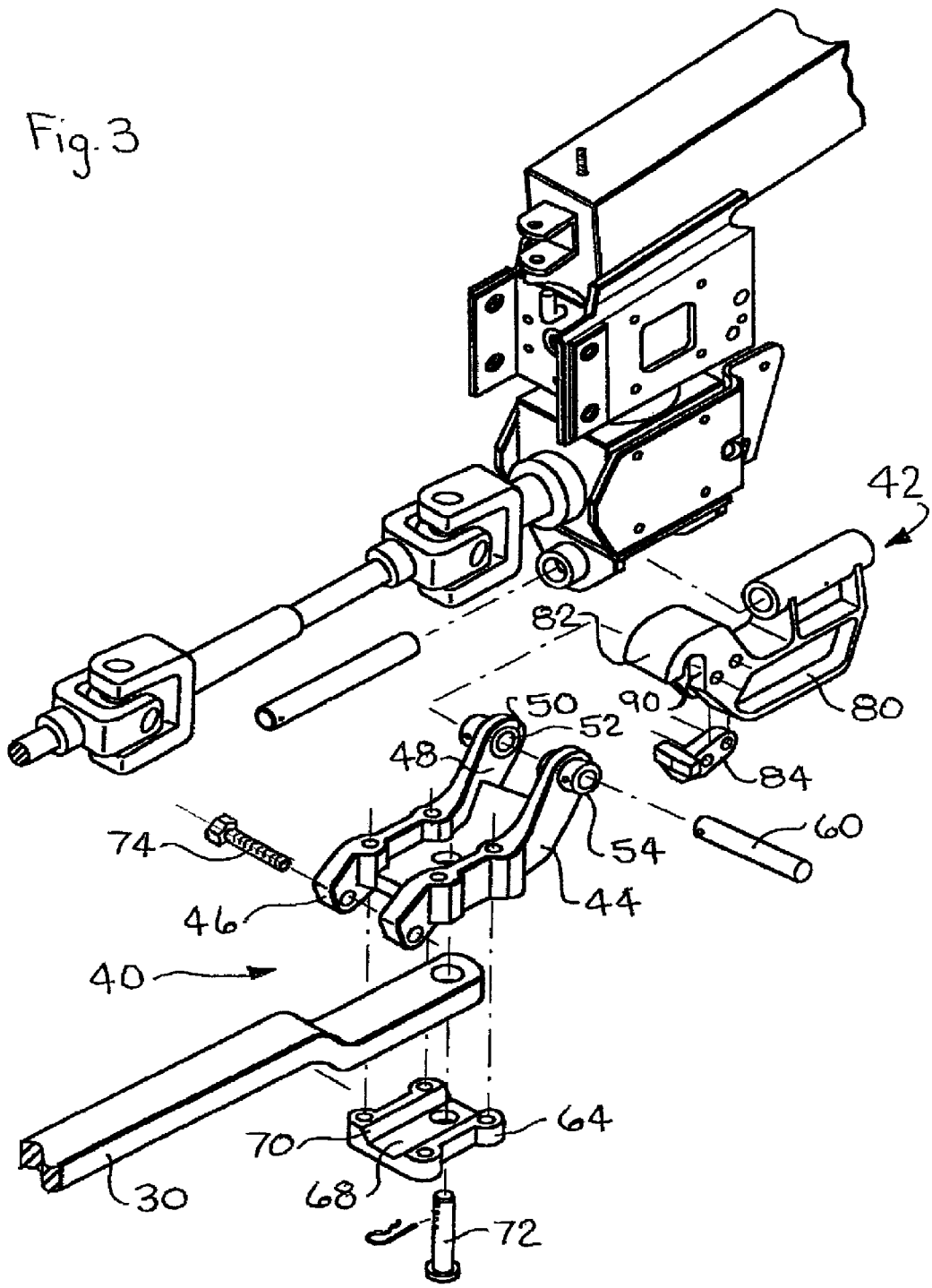
FIG. 3 is an exploded perspective view of the adapter assembly of FIG. 2.
Figure 4:
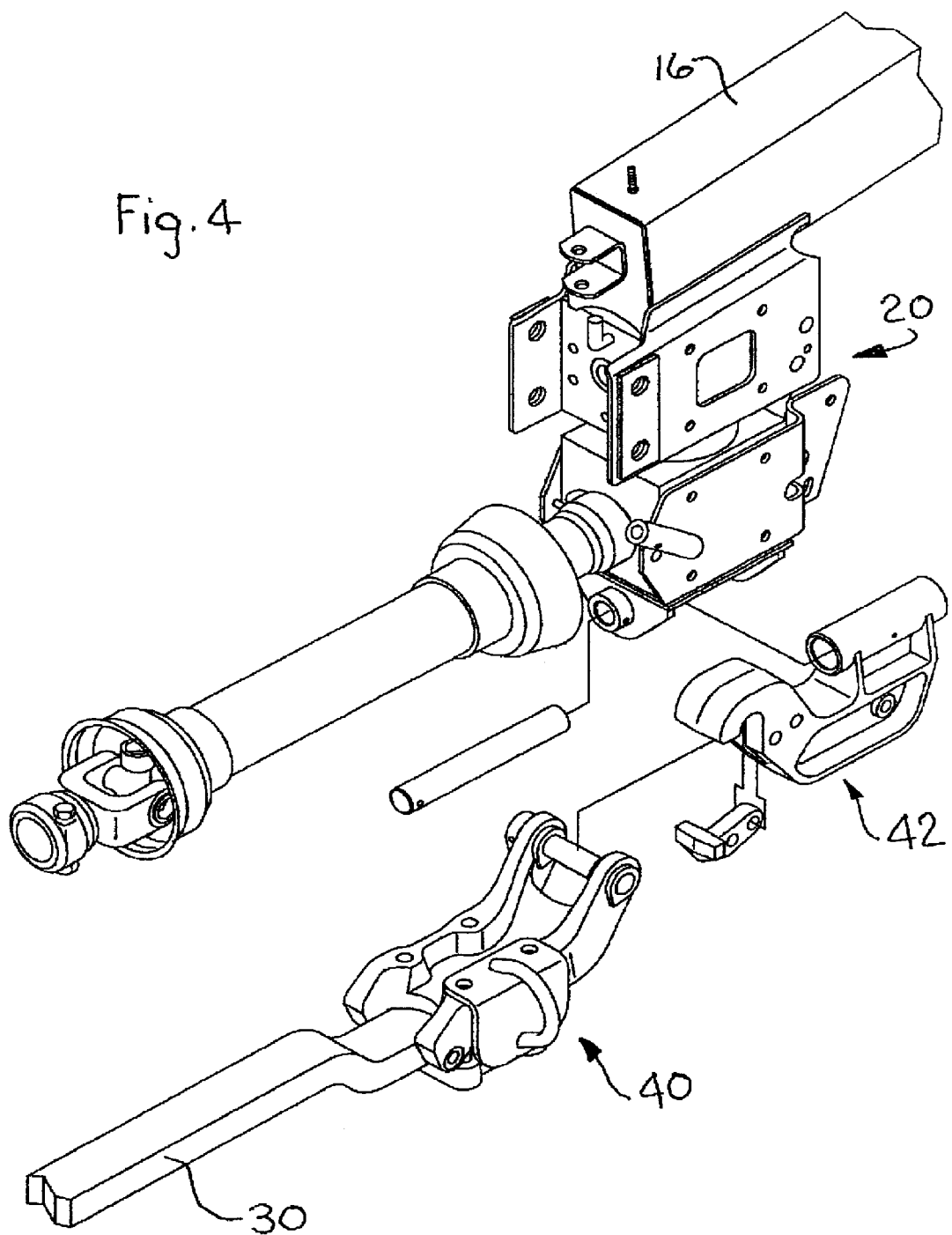
FIG. 4 is another perspective view of the adapter assembly that is similar to FIG. 3 and shows additional detail.

As best seen in FIGS. 3 and 4, the first frame portion 40 of the adapter assembly 32 includes a drawbar extension member 44 having a proximal end 46 and a bifurcated distal end 48. The proximal end 46 is configured to fit over the top of the drawbar hitch 30. The distal end of the drawbar extension member includes an open yoke 50 having a pair of opposed holes 52. The holes may be provided with sleeves or bearings 54. A removable cross pin 60 is positioned through the pair of holes 52 and horizontally across the yoke in the drawbar extension member 44. The cross pin 60 is secured in the yoke by a known securing mechanism, such as at least one smaller pin (not shown) through both the cross pin 60 and sleeve or bearing 54. The securing mechanism allows the cross pin 60 to be removed and replaced as needed.

The first frame portion 40 further includes a clamping assembly 62 including a bottom bracket member 64. The drawbar hitch 30 is clamped between the drawbar extension member 44 and the bottom bracket member 64 with clamp bolts 66 (shown in FIG. 2). The bottom bracket member 64 is preferably formed with a longitudinal channel 68 having two beveled or sloped surfaces 70. The beveled surfaces 70 contact two bottom corners of the drawbar and provide adjustibility to fit different size drawbars.

A drawbar hitch pin 72 is vertically inserted from the top or bottom of the first frame portion 40 so as to pass through a suitable hole in the drawbar extension member 44, through the hole in the drawbar hitch 30 and throughout a matching hole in the bottom bracket member 64. A cotter pin is used to secure the drawbar hitch pin 72 in place. The drawbar hitch pin 72 prevents the drawbar extension member 44 from being pulled longitudinally off the drawbar hitch 30. Set screws 74 (only one shown) through the opposite sides of the drawbar extension member 44 are used to resist rotation of the first frame portion 40 about the vertical axis of the drawbar hitch 30 should the clamp bolts 66 loosen.

The second frame portion 42 for the draft tongue of the implement includes a frame body 80 and a fixed downward open hook 82. A pivoting pawl 84 is positioned adjacent and opposite the open hook on the frame body 80. The pawl 84 pivots on a pawl pivot pin 86 (shown in FIG. 2) and remains open under the pawl's own weight during hookup. An insertable locking pin 88 (shown in FIG. 2) is provided to secure the pawl in the closed position.

When towing vehicle 12 is hooked up to the implement 10, the horizontal cross-pin 60 in the tractor drawbar extension member 44 is positioned under the fixed downward open hook 82 of the implement second frame portion 42. The operator uses a mechanism on the implement, such as an adjustable jack, to lower the implement. The open hook 82 has a flat vertical surface 90 adjacent and below the open portion of the hook. The flat vertical surface 90 and chamfered edges on the hook 82 help guide the hook down onto the cross-pin 60 when the two frame portions 40 and 42 are not in direct alignment.

A method for connecting a towed implement having a pull-through swivel hitch gearbox assembly 20 to a towing vehicle having a drawbar hitch 30 will now be described. The drawbar extension member 44 having a horizontal cross pin 60 is positioned on the drawbar of the towing vehicle. The clamping assembly 62 including the bottom bracket member 64, the clamp bolts 66 and the set screws 74 are used to secure the drawbar extension member 44 to the drawbar hitch 30. The drawbar hitch pin 72 is also inserted through the drawbar extension member 44, the drawbar and the bottom bracket member 64. The second frame portion 42 having a downward open hook 82 is positioned on the draft tongue 16 of the implement and coupled to the swivel hitch gearbox assembly 20. The implement 10 is then lowered to engage the downward open hook 82 onto engagement with the cross pin 60.

The pivotally mounted pawl 84 is then manually rotated into a closed position to prevent the fixed open hook 82 from disengaging from the cross pin 60. The pawl is retained in this position with a securing mechanism such as a locking pin, for example a hairpin cotter pin.

The drawings, specific examples, and particular embodiments serve the purpose of illustration only. The materials and configurations shown and described may differ depending on the chosen performance characteristics and physical characteristics of the equipment. For example, the type of harvesting equipment may differ. The systems shown and described are not limited to the precise details and conditions disclosed. Furthermore, other substitutions, modifications, changes, and omissions may be made in the design, operating conditions, and arrangement of the exemplary embodiments without departing from the spirit of the invention as expressed in the appended claims.

What is claimed is:

1. A drawbar adapter assembly for a towing vehicle having a drawbar hitch for connecting a towed implement having a pull-through swivel hitch gearbox assembly to the towing vehicle, the adapter assembly, comprising:

a first frame portion including a drawbar extension member having a proximal end and a distal end defining an open yoke;

a horizontal cross pin spanning the open yoke;

a clamp assembly to secure the drawbar extension member to the drawbar hitch;

a second frame portion having an open downward hook for engagement with the cross pin; and a trunnion assembly to couple the second frame portion to the swivel hitch gearbox assembly, wherein the clamp assembly comprises a bottom bracket member positioned under the drawbar hitch and is securable to the drawbar extension member to provide a clamping load on the drawbar hitch so as to capture the drawbar hitch between the bottom bracket member and the drawbar extension member and wherein the bottom bracket member includes a channel cross-section having two beveled sides edges to engage the drawbar hitch for adjustable fit of the drawbar hitch.

2. The adapter assembly of claim 1 further comprising a pawl pivotally mounted on the second frame portion opposite the open hook so as to rotate from an open position to a closed position to secure the hook on the engaged cross pin.

3. The adapter assembly of claim 2 further comprising means for locking the pawl in the closed position.

4. The adapter assembly of claim 1 further comprising means for guiding the open hook into alignment with the cross pin when the towing vehicle is moved into an abutting position with the towed implement.

5. The adapter assembly of claim 4 wherein the means for guiding is a flat vertical surface adjacent the open hook which guides the hook onto the cross pin as the second frame portion of the implement is lowered onto the cross pin of the drawbar extension portion.

6. In a towed implement having a pull-through swivel hitch gearbox assembly for connection to a towing vehicle having a drawbar hitch, a drawbar adapter assembly for the towed implement comprising:

a drawbar extension member having a distal end with an open yoke and a horizontal cross pin;

means for securing the drawbar extension member to the drawbar hitch;

an adapter frame portion having an open downward hook to engage the cross pin; and a trunnion assembly to couple the adapter frame portion to the swivel hitch gearbox assembly and to allow rotation about a roll axis, wherein the trunnion assembly is disposed relative to the open downward hook such that torque about the roll axis is dissipated by the trunnion assembly prior to acting on the open downward hook, wherein the means for securing comprises a bottom bracket member positioned under the drawbar hitch and is securable to the drawbar extension member to provide a clamping load on the drawbar hitch so as to capture the drawbar hitch between the bottom bracket member and the drawbar extension member.

7. The towed implement of claim 6 further comprising a pawl pivotally mounted on the adapter frame portion opposite the open hook to rotate from an open position to a closed position to retain the hook on the engaged cross pin.

8. The towed implement of claim 7 further comprising means for locking the pawl in the closed position.

9. The towed implement of claim 6 further comprising means for guiding the open hook into alignment with the cross pin when the towing vehicle is moved into an abutting position with the towed implement.

10. The towed implement of claim 9 wherein the means for guiding is a flat vertical surface on the open hook which guides the hook onto the cross pin as the adapter frame portion of the implement is lowered onto the cross pin of the drawbar extension portion.

11. The towed implement of claim 6, further comprising a draft tongue, wherein the swivel hitch gearbox assembly includes an upper gearbox affixed to the draft tongue and a lower gearbox pivotally connected to the upper gearbox, and the means for securing is affixed to the lower gearbox, whereby a pulling load is transmitted from the drawbar hitch through the upper and lower gearboxes to the draft tongue.

* * * * *